US010535866B2

(12) United States Patent
Wakizaka et al.

(10) Patent No.: US 10,535,866 B2
(45) Date of Patent: Jan. 14, 2020

(54) CARBON MATERIAL, CARBONACEOUS MATERIAL FOR BATTERY ELECTRODE, AND BATTERY

(71) Applicant: SHOWA DENKO K.K., Tokyo (JP)

(72) Inventors: Yasuaki Wakizaka, Tokyo (JP); Yuichi Kamijo, Tokyo (JP); Tomohiro Abe, Tokyo (JP); Yoshiki Shimodaira, Tokyo (JP); Akinori Sudoh, Tokyo (JP); Chiaki Sotowa, Tokyo (JP); Yoshihito Yokoyama, Tokyo (JP); Takashi Terashima, Tokyo (JP)

(73) Assignee: SHOWA DENKO K.K., Minato-ku, Tokyo (JP)

( * ) Notice: Subject to any disclaimer, the term of this patent is extended or adjusted under 35 U.S.C. 154(b) by 418 days.

(21) Appl. No.: 14/411,604

(22) PCT Filed: Jun. 27, 2013

(86) PCT No.: PCT/JP2013/067697
§ 371 (c)(1),
(2) Date: Dec. 29, 2014

(87) PCT Pub. No.: WO2014/003135
PCT Pub. Date: Jan. 3, 2014

(65) Prior Publication Data
US 2015/0162600 A1 Jun. 11, 2015

(30) Foreign Application Priority Data

Jun. 29, 2012 (JP) .................................. 2012-147515
Feb. 4, 2013 (JP) .................................. 2013-019469

(51) Int. Cl.
H01M 4/133 (2010.01)
H01M 4/587 (2010.01)
(Continued)

(52) U.S. Cl.
CPC ............. H01M 4/133 (2013.01); C01B 32/05 (2017.08); C01B 32/20 (2017.08);
(Continued)

(58) Field of Classification Search
CPC ............................ H01M 4/133; H01M 4/583
See application file for complete search history.

(56) References Cited

U.S. PATENT DOCUMENTS 5,514,496 A * 5/1996 Mishima ............... H01M 4/581
429/224
2002/0068221 A1* 6/2002 Watanabe ............... H01M 2/08
429/231.5
(Continued)

FOREIGN PATENT DOCUMENTS

CN 101321695 A 12/2008
CN 101980957 A 2/2011
(Continued)

OTHER PUBLICATIONS

Communication dated May 31, 2017, issued from the German Patent Office in corresponding Application No. 11 2013 003 030.6.
(Continued)

Primary Examiner — Olatunji A Godo
(74) Attorney, Agent, or Firm — Sughrue Mion, PLLC

(57) ABSTRACT

A scale-like graphite and carbon material for a battery electrode which is suitable for use as an electrode material for an aqueous-electrolyte secondary battery, wherein the ratio $I_G/I_D$ (G value) between the peak area ($I_D$) in a range of 1300 to 1400 cm$^{-1}$ and the peak area ($I_G$) in a range of 1580 to 1620 cm$^{-1}$ by Raman spectroscopy spectra, in which an edge surface of the particle of the scale-like graphite is measured with by a Raman microspectrometer, is 5.2 to 100 and the average interplanar spacing d002 of plane (d002) by the X-ray diffraction method is 0.337 nm or less and optical structures of the scale-like graphite have a specific shape; the method for producing the same; a carbon material for a battery electrode and a paste for an electrode containing the material; and a secondary battery having excellent charge/
(Continued)

discharge cycle characteristics and high current load characteristics.

17 Claims, 2 Drawing Sheets

(51) Int. Cl.
    *H01M 4/36*     (2006.01)
    *C01B 32/05*     (2017.01)
    *C01B 32/20*     (2017.01)
    *H01M 4/1393*     (2010.01)
    *H01M 10/0525*     (2010.01)

(52) U.S. Cl.
    CPC ......... *H01M 4/1393* (2013.01); *H01M 4/364* (2013.01); *H01M 4/587* (2013.01); *H01M 10/0525* (2013.01); *Y10T 428/2982* (2015.01)

(56) References Cited

U.S. PATENT DOCUMENTS

| | | | |
|---|---|---|---|
| 2002/0197201 A1* | 12/2002 | Fukuda | C01B 32/20 423/448 |
| 2008/0274406 A1* | 11/2008 | Fuse | H01M 4/364 429/231.4 |
| 2009/0202917 A1* | 8/2009 | Sotowa | H01M 4/133 429/311 |
| 2009/0242830 A1 | 10/2009 | Mao et al. | |
| 2009/0242849 A1 | 10/2009 | Sudoh et al. | |
| 2009/0280413 A1* | 11/2009 | Ohta | C01B 31/04 429/231.8 |
| 2010/0086856 A1* | 4/2010 | Matsumoto | H01M 4/1393 429/231.8 |
| 2010/0221543 A1 | 9/2010 | Sudoh et al. | |
| 2011/0081583 A1* | 4/2011 | Sugimoto | H01M 2/145 429/346 |
| 2012/0045642 A1* | 2/2012 | Nishimura | H01M 4/133 428/367 |
| 2012/0052393 A1* | 3/2012 | Kameda | C01B 31/04 429/231.8 |
| 2012/0070733 A1* | 3/2012 | Yamada | H01M 4/133 429/211 |
| 2012/0196193 A1* | 8/2012 | Sotowa | H01M 4/133 429/338 |

FOREIGN PATENT DOCUMENTS

| | | |
|---|---|---|
| JP | 4-190555 A | 7/1992 |
| JP | 7-320740 A | 12/1995 |
| JP | 2002-270169 A | 9/2002 |
| JP | 3361510 B2 | 1/2003 |
| JP | 2003-77534 A | 3/2003 |
| JP | 3534391 B2 | 6/2004 |
| JP | 2009-200048 A | 9/2009 |
| WO | 03/064560 A1 | 8/2003 |
| WO | 2008/026380 A1 | 3/2008 |
| WO | WO2010100764 * | 9/2010 |
| WO | 2011/049199 A1 | 4/2011 |
| WO | 2011/121988 A1 | 10/2011 |

OTHER PUBLICATIONS

Rasband, W., "ImageJ", Wikipedia, Apr. 1, 2017, pp. 1-2, (2 pages total).

Energy & Fuels 2006, 20, 1227-1234, Asphaltene Molecular Structure and Chemical Influences on the Morphology of Coke Produced in Delayed Coking, M. Siskin, S. R. Kelemen, C.P. Eppig, L.D. Brown, and M. Afeworki.

International Search Report of PCT/JP2013/067697, dated Sep. 17, 2013. [PCT/ISA/210].

Communication dated Mar. 9, 2015 from the German Patent Office in counterpart application No. 11 2013 003 030.6.

Communication dated Feb. 4, 2015 from the State Intellectual Property Office of the People's Republic of China in counterpart application No. 201380004467.7.

* cited by examiner

[FIG. 1]
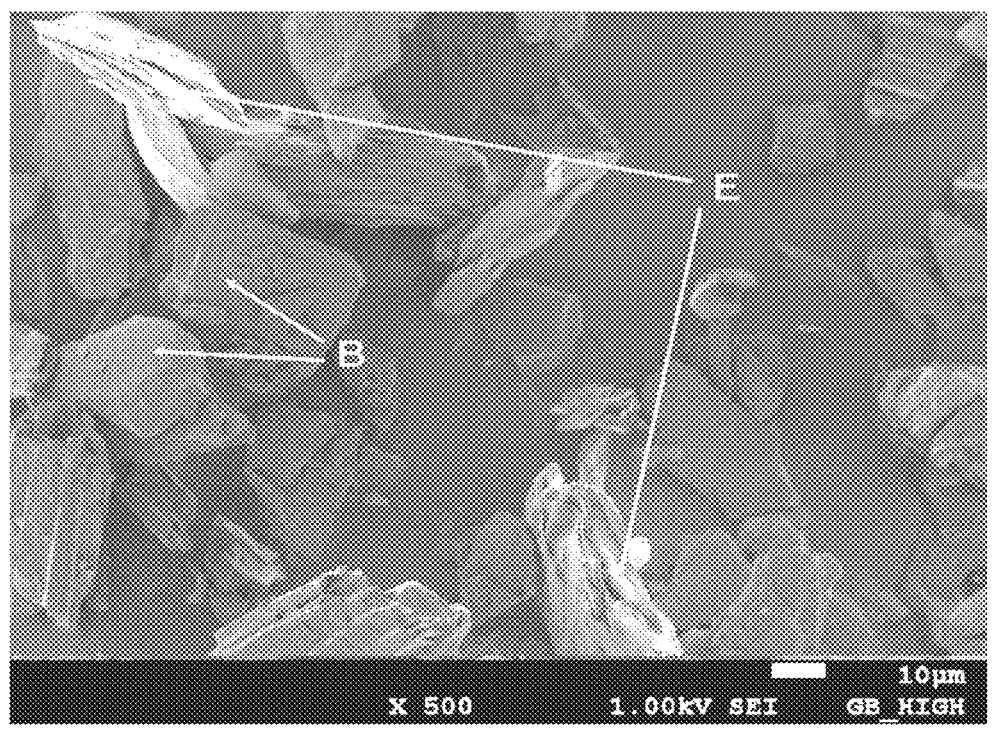

[Fig. 2]
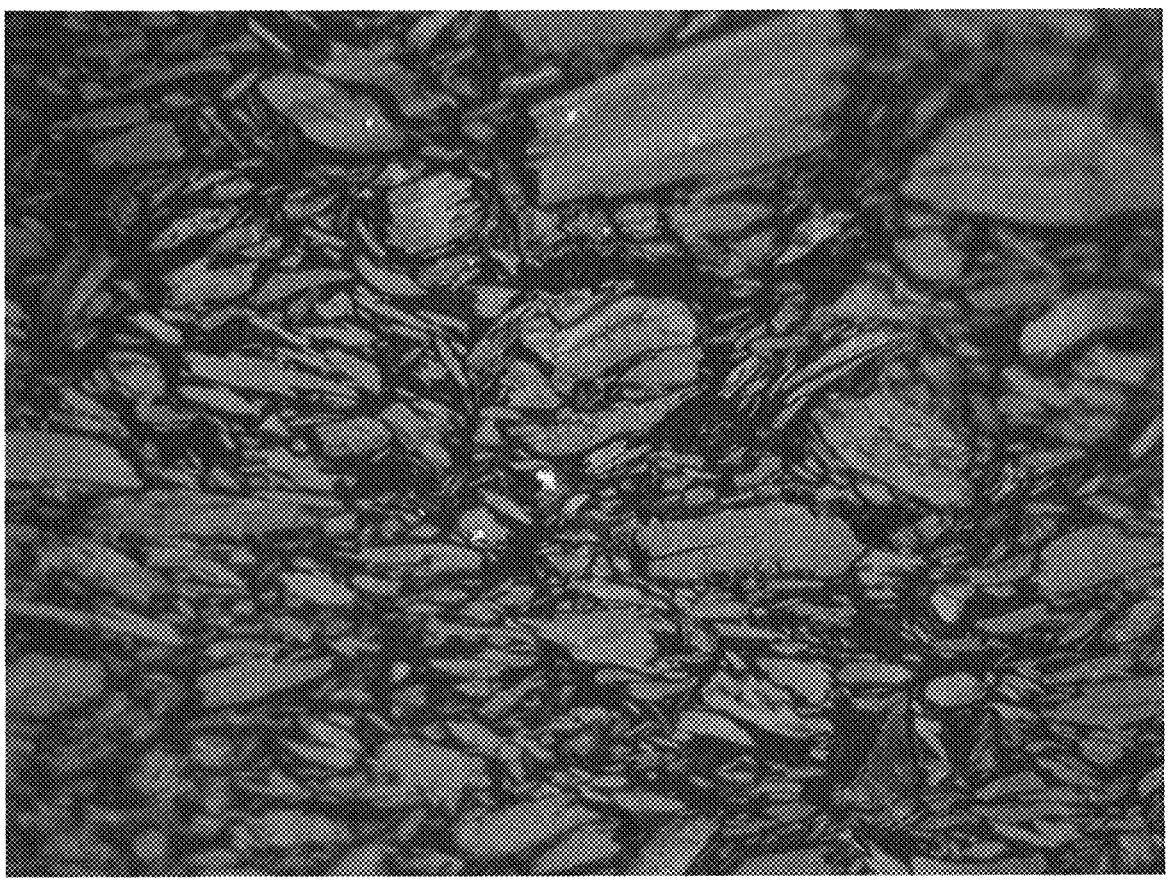

CARBON MATERIAL, CARBONACEOUS MATERIAL FOR BATTERY ELECTRODE, AND BATTERY

CROSS-REFERENCE TO RELATED APPLICATIONS

This application is a National Stage of International Application No.: PCT/JP2013/067697 filed Jun. 27, 2013, claiming priority based on Japanese Patent Application Nos.: 2012-147515, filed Jun. 29, 2012 and 2013-019469, filed Feb. 4, 2013, the contents of all of which are incorporated herein by reference in their entirety.

TECHNICAL FIELD

The present invention relates to a scale-like graphite, a carbon material for a battery electrode, and a battery. More specifically, the present invention relates to a scale-like graphite which is suitable as an electrode material for a non-aqueous electrolyte secondary battery; a carbon material for a battery electrode; and a secondary battery excellent in charge/discharge cycle characteristics and large current load characteristics.

BACKGROUND ART

As a power source of a mobile device, or the like, a lithium ion secondary battery is mainly used. The function of the mobile device or the like is diversified, resulting in increasing in power consumption thereof. Therefore, a lithium ion secondary battery is required to have an increased battery capacity and, simultaneously, to have an enhanced charge/discharge cycle characteristic.

Further, there is an increasing demand for a secondary battery with a high output and a large capacity for electric tools such as an electric drill and a hybrid automobile. In this field, conventionally, a lead secondary battery, a nickel-cadmium secondary battery, and a nickel-hydrogen secondary battery are mainly used. A small and light lithium ion secondary battery with high energy density is highly expected, and there is a demand for a lithium ion secondary battery excellent in large current load characteristics.

In particular, in applications for automobiles, such as battery electric vehicles (BEV) and hybrid electric vehicles (HEV), a long-term cycle characteristic over 10 years and a large current load characteristic for driving a high-power motor are mainly required, and a high volume energy density is also required for extending a driving range (distance), which are severe as compared to mobile applications.

In the lithium ion secondary battery, generally, a lithium salt, such as lithium cobaltate, is used as a positive electrode active material, and a carbonaceous material, such as graphite, is used as a negative electrode active material.

Graphite is classified into natural graphite and artificial graphite.

Among those, natural graphite is available at a low cost. However, as natural graphite has a scale shape, if natural graphite is formed into a paste together with a binder and applied to a current collector, natural graphite is aligned in one direction. When an electrode made of such a material is charged, the electrode expands only in one direction, which degrades the performance of the electrode. Natural graphite, which has been granulated and formed into a spherical shape, is proposed, however, the resulting spherical natural graphite is aligned because of being crushed by pressing in the course of electrode production. Further, the surface of the natural graphite is active, and hence a large amount of gas is generated during initial charging, which decreases an initial efficiency and degrades a cycle characteristic. In order to solve those problems, Japanese Patent publication No. 3534391 (U.S. Pat. No. 6,632,569, Patent Document 1), etc. propose a method involving coating artificial carbon on the surface of the natural graphite processed into a spherical shape.

Regarding artificial graphite, there is exemplified a mesocarbon microsphere-graphitized article described in JP 04-190555 A (Patent Document 2) and the like.

Artificial graphite typified by graphitized articles made of oil, coal pitch, coke and the like is available at a relatively low cost. However, a satisfactory crystalline needle-shaped coke tends to align in a scale shape. In order to solve this problem, the method described in Japanese patent publication No. 3361510 (Patent Document 3) and the like yield results.

Further, negative electrode materials using so-called hard carbon and amorphous carbon described in JP 07-320740 A (U.S. Pat. No. 5,587,255; Patent Document 4) are excellent in a characteristic with respect to a large current and also have a relatively satisfactory cycle characteristic.

JP-A-2003-77534 (Patent Document 5) teaches that excellent high-rate discharge can be achieved by using artificial graphite having highly-developed pores.

WO 2011/049199 (U.S. Pat. No. 8,372,373; Patent Document 6) discloses artificial graphite being excellent in cycle characteristics.

JP-A-2002-270169 (U.S. Pat. No. 7,141,229; Patent Document 7) discloses an artificial graphite negative electrode produced from needle-shaped green coke having anisotropy based on a flow configuration texture.

WO 2003/064560 (U.S. Pat. No. 7,323,120; JP-A-2005-515957; Patent Document 8) discloses an artificial graphite negative electrode produced from cokes coated with petroleum pitch in a liquid phase.

PRIOR ART

Patent Documents

Patent Document 1: JP 3534391 B2
Patent Document 2: JP 04-190555 A
Patent Document 3: JP 3361510 B2
Patent Document 4: JP 07-320740 A
Patent Document 5: JP 2003-77534 A
Patent Document 6: WO 2011/049199
Patent Document 7: JP-A-2002-270169
Patent Document 8: WO 2003/064560 (JP-A-2005-515957)

DISCLOSURE OF THE INVENTION

Problems to be Solved by the Invention

The material produced by the method described in Patent Document 1 can address a high-capacity, a low-current, and an intermediate-cycle characteristic required by the mobile applications, etc. However, it is very difficult for the material to satisfy the requests such as a large current and an ultralong-term cycle characteristic of a large battery as described above.

The graphitized article described in Patent Document 2 is a well-balanced negative electrode material, and is capable of producing a battery with a high capacity and a large current. However, it is difficult to achieve the cycle characteristic for a much longer period of time than the one for mobile applications, which are required for a large battery.

The method according to Patent Document 3 can allow the use of not only fine powder of an artificial graphite material but also fine powder of a natural graphite, or the like, and exhibits very excellent performance for a negative electrode material for the mobile applications. This material can address the high-capacity, the low-current, and the intermediate cycle characteristic required for the mobile applications, etc. However, this material has not satisfied requests such as a large current and an ultralong-term cycle characteristic of a large battery as described above.

The volume energy density of the negative electrode material described in Patent Document 4 is too low and the price of the material is very expensive, and thus, such negative electrode materials are only used for some special large batteries.

In Patent Document 5, the capacity retention at the time of charge and discharge is not sufficient for actual use in secondary batteries.

In Patent Document 6, the graphite has a high texture density and there was room for improvement on the ion diffusion of the active substance.

In Patent Document 7, although the capacity and initial charge-discharge efficiency showed some improvement compared to the case of using conventional artificial graphite, the graphite negative electrode has not been developed to a practical level.

In Patent Document 8, the electrode capacity has remained as an issue to be solved. Also, the production involves an operation of using large quantities of organic solvent and evaporating it, which makes the production method cumbersome.

Means to Solve the Problem

[1] A scale-like graphite, wherein the ratio $I_G/I_D$ (G value) between the peak area ($I_D$) of a peak in a range of 1300 to 1400 cm$^{-1}$ and the peak area ($I_G$) of a peak in a range of 1580 to 1620 cm$^{-1}$ measured by Raman spectroscopy spectra when an edge surface of the particle of the scale-like graphite is measured with Raman microspectrometer is 5.2 or more and 100 or less and the average interplanar spacing d002 of plane (002) by the X-ray diffraction method is 0.337 nm or less; and by observing the optical structures in the cross-section of the molded body made of the scale-like graphite in a rectangular field of 480 μm×540 μm under a polarizing microscope, when areas of the optical structures are accumulated from a smallest structure in an ascending order, SOP represents an area of an optical structure whose accumulated area corresponds to 60% of the total area of all the optical structures; when the structures are counted from a structure of a smallest aspect ratio in an ascending order, AROP represents the aspect ratio of the structure which ranks at the position of 60% in the total number of all the structures; and when D50 represents an average particle diameter based on a volume by laser diffraction method; SOP, AROP and D50 satisfy the following relationship:

$$1.5 \leq AROP \leq 6 \text{ and}$$

$$0.2 \times D50 \leq (SOP \times AROP)^{1/2} < 2 \times D50.$$

[2] The scale-like graphite as described in [1] above, wherein an average particle diameter based on a volume by laser diffraction method (D50) is 1 μm or more and 50 μm or less.

[3] The scale-like graphite as described in [1] or [2] above, which is artificial graphite treated at a temperature of 2,400° C. or more and 3,600° C. or less.

[4] The scale-like graphite as described in any one of [1] to [3] above, wherein the BET specific surface area is 0.4 m$^2$/g or more and 5 m$^2$/g or less.

[5] A method for producing the scale-like graphite as described in any one of [1] to [4] above, comprising a process of mixing the particles obtained by pulverizing the calcined coke and the particles obtained by pulverizing petroleum pitch or coal-tar pitch and subjecting the mixture to heat treatment at a temperature of 2,400° C. or more and 3,600° C. or less.

[6] The production method as described in [5] above, wherein the average particle diameter based on a volume by laser diffraction method of the particles obtained by pulverizing calcined coke (D50) Dc is 1 μm or more and 50 μm or less, and the average particle diameter of the particles obtained by pulverizing petroleum pitch or coal-tar pitch (D50) Dp is smaller than Dc and is 0.01 μm or more and 25 μm or less.

[7] The production method as described in [6] above, wherein Dc/Dp is 1.5 or more and less than 200.

[8] The production method as described in any one of [5] to [7] above, wherein the mass of the particles obtained by pulverizing petroleum pitch or coal-tar pitch is 0.5 mass % or more and 15 mass % or less to the total mass of the particles obtained by pulverizing calcined coke and the particles obtained by pulverizing petroleum pitch or coal-tar pitch.

[9] The production method as described in any one of [5] to [8] above, wherein by observing the optical structures of the calcined coke in a rectangular field of 480 μm×540 μm under a polarizing microscope, when areas of the optical structures are accumulated from a smallest structure in an ascending order, an area of an optical structure whose accumulated area corresponds to 60% of the total area of all the optical structures is 10 μm$^2$ or more and 5,000 μm$^2$ or less; when the optical structures are counted from a structure of a smallest aspect ratio in an ascending order, the aspect ratio of the structure which ranks at the position of 60% in the total number of all the structures is 1.5 or more and 6 or less.

[10] A carbon material for a battery electrode, comprising the scale-like graphite as described in any one of [1] to [4].

[11] A carbon material for a battery electrode, comprising 100 parts by mass of the scale-like graphite as described in any one of [1] to [4] and 0.01 to 200 parts by mass of natural graphite or artificial graphite, wherein an average interplanar spacing (d002) of the natural graphite or artificial graphite is 0.3370 nm or less.

[12] A carbon material for a battery electrode, comprising 100 parts by mass of the scale-like graphite as described in any one of [1] to [4] and 0.01 to 120 parts by mass of natural graphite or artificial graphite, wherein an aspect ratio of the natural graphite or artificial graphite is 2 to 100, and an average interplanar spacing (d002) of the natural graphite or artificial graphite is 0.3370 nm or less.

[13] A paste for an electrode comprising the carbon material for a battery electrode as described in any one of [10] to [12] above and a binder.

[14] An electrode comprising a molded body of the paste for an electrode as described in [13] above.

[15] A battery comprising the electrode described in [14] above as a constituting element.

[16] The carbon material for a battery electrode as described in any one of [10] to [12] above, wherein, in the evaluation test of the battery described in [15] above fabricated as a three-electrode cell by laminating a carbon electrode (negative electrode), a positive electrode and a reference electrode, the ratio (change rate of the electrode thickness) (T500/T10) of the thickness (T500) in a discharge state after repeating 500 cycles of charge and discharge to the thickness (T10) in a discharge state after performing 10 cycles of initial aging is 1.0 or more and 1.30 or less.

[17] The electrode as described in [14] above, wherein, in the evaluation test of the battery described in [15] above fabricated as a three-electrode cell by laminating a carbon electrode (negative electrode), a positive electrode and a reference electrode, the ratio (change rate of the electrode thickness) (T500/T10) of the thickness (T500) in a discharge state after repeating 500 cycles of charge and discharge to the thickness (T10) in a discharge state after performing 10 cycles of initial aging is 1.0 or more and 1.30 or less.

Effects of the Invention

Using the scale-like graphite of the present invention as the carbon material for the battery electrode improves the diffusion of lithium ions, and therefore a battery electrode can be obtained which has an excellent reversibility in the charge and discharge reaction and especially has a small change rate of the electrode thickness, a high energy density and the capability of high-speed charge and discharge when an secondary battery is fabricated, while maintaining a high capacity, the initial high coulomb efficiency and the high cycle characteristics.

Further, the scale-like graphite of the present invention can be produced by the method excellent in economic efficiency and mass productivity with safety improved.

BRIEF DESCRIPTION OF DRAWINGS

FIG. 1 shows an SEM image of the scale-like graphite of Example 1. Note that the portion indicated by "E" corresponds to the edge surface of the particle and the portion indicated by "B" corresponds to the basal surface of the particle.

FIG. 2 shows the polarizing microscope image (480 μm×540 μm) of the scale-like graphite of Example 2. The black portion is resin and the gray portion is optical structures.

MODE FOR CARRYING OUT THE INVENTION (1) Scale-Like Graphite

The electrode of the rechargeable battery is required to charge more electricity per unit volume. The graphite used as an electrode active substance of the lithium secondary battery is excellent in coulomb efficiency at initial charge and discharge. However, there is an upper limit to the stoichiometric proportion of the lithium insertion to carbon atoms and it is difficult to increase the energy density per mass to the stoichiometric proportion or higher. Therefore, it is necessary to increase the mass per electrode volume: i.e. the electrode density to improve the energy density of the electrode.

Generally, an electrode for a battery is produced by drying an active substance applied onto a current collector plate and subsequent pressing. Pressing improves the filling property of the active substance per volume, and if the active substance is soft enough to be deformed to some degree by pressing, it is possible to significantly increase the electrode density.

Since graphite particles are hard when the graphite has a complicated structure or low orientation, it is necessary to allow the graphite particles to have a large structure in order to increase the electrode density. It has been long known that there is a structure in which crystal grows and a graphite network face is arranged exhibits optical anisotropy, and a structure in which crystal does not develop completely or a material such as hard carbon in which crystal is largely disturbed exhibits optical isotropy. With respect to the observation of these structures, a crystal size can be measured by the X-ray diffraction method and the structures can be observed by a polarizing microscope observation method described in, for example, "Modern Carbon Material Experimental Technology (Analysis part) edited by The Carbon Society of Japan (2001), published by Sipec Corporation, pages 1-8". In the present invention, a structure in which polarization can be observed is referred to as an optical structure.

In the scale-like graphite in a preferable embodiment of the present invention, the size and shape of the optical structures are within a specific range. Furthermore, due to an appropriate degree of graphitization, it becomes a material being excellent both in easiness to be collapsed as a material for an electrode and in battery properties.

With respect to the size and shape of the optical structure, it is desirable that the above-mentioned scale-like graphite satisfies the following formula:

$$1.5 \leq AROP \leq 6 \text{ and}$$

$$0.2 \times D50 \leq (SOP \times AROP)^{1/2} < 2 \times D50.$$

By observing optical structures in the cross-section of the molded body made of the scale-like graphite in a rectangular field of 480 μm×540 μm under a polarizing microscope, when areas of the optical structures are accumulated from the smallest structure in an ascending order, SOP represents an area corresponding to the accumulated area of 60% of the total area of all the optical structures. When the structures are counted from a structure of the smallest aspect ratio in an ascending order, AROP represents the aspect ratio of the structure which ranks at the position of 60% in the total number of all the structures.

D50 represents a volume-based cumulative particle size of 50% (an average particle diameter) measured by a laser diffraction particle size distribution analyzer and an apparent diameter of the scale-like particles. As a laser diffraction type particle size distribution analyzer, for example, Mastersizer produced by Malvern Instruments Ltd. or the like can be used.

The scale-like graphite in a preferable embodiment of the present invention has a scale-like shape. Since the optical structures in the carbon material are cured while flowing, it is often strip-shaped. When the cross-section of a molded body composed of the scale-like graphite is observed, the shape of the optical structures is almost rectangular, and it can be assumed that the area of the structure corresponds to the product of the longer diameter and the shorter diameter of the structure. Also, the shorter diameter is the longer diameter/aspect ratio. Assuming that the optical structure as an object to be measured for the area represented by SOP and the optical structure as an object to be measured for the aspect ratio represented by AROP are the same, the longer diameter in the optical structure turns to be $(SOP \times AROP)^{1/2}$. That is, $(SOP \times AROP)^{1/2}$ defines the longer diameter in an optical structure having a specific size, and based on the ratio of $(SOP \times AROP)^{1/2}$ to the average particle diameter (D50), the above-mentioned formula defines that the optical structure is larger than a certain size.

$(SOP \times AROP)^{1/2}$ which defines a longer diameter of an optical structure is generally smaller than an average particle diameter D50. However, when the $(SOP \times AROP)^{1/2}$ value is closer to D50, it means that the particles in the scale-like graphite consist of a smaller number of optical structures. In a case where $(SOP \times AROP)^{1/2}$ is smaller compared to D50, it means that the particles in the scale-like graphite comprise a large number of optical structures. When the $(SOP \times AROP)^{1/2}$ value is 0.2×D50 or more, there are fewer borders of the optical structures, which is preferable for the lithium ion diffusion and enables a high-rate charge and discharge. When the value is larger, the scale-like graphite can retain a larger number of lithium ions. The value is preferably 0.25×D50 or more, more preferably 0.28×D50 or more, and still more preferably 0.35×D50 or more. The value is less than 2×D50 at maximum, and preferably 1×D50 or less.

The average particle diameter (D50) of the scale-like graphite in a preferable embodiment of the present invention is 1 μm or more and 50 μm or less. Pulverizing by special equipment is required to make D50 less than 1 μm and more energy is required as a result. On the other hand, if the D50 value is too large, it takes a longer time for the lithium diffusion in the negative electrode material and it tends to reduce the charge and discharge rate. A preferred D50 value is from 5 μm to 35 μm. Considering that fine powder has a large surface area and is likely to give rise to an unintended reaction so that it should be reduced, D50 is more preferably 10 μm or more. When the scale-like graphite is for use in the power source of the drive force and the like required generating a large current, D50 is preferably 25 μm or less.

The aspect ratio of the scale-like graphite, AROP, is from 1.5 to 6, more preferably from 2.0 to 4.0. An aspect ratio larger than the above lower limit is preferable because it allows the optical structures to slide over each other and an electrode having a high density can be easily obtained. An aspect ratio smaller than the upper limit is preferable because it requires little energy to synthesize a raw material.

The methods for observation and analysis of the optical structures are as described below.

[Production of Polarizing Microscope Observation Sample]

The "cross-section of the molding made of a scale-like graphite" as used herein is prepared as follows.

A double-stick tape is attached to the bottom of a sample container made of plastic with an internal volume of 30 cm³, and two spatula scoops (about 2 g) of a sample for observation is placed on the double-stick tape. A curing agent (Curing Agent (M-agent) (trade name), produced by Nippon Oil and Fats Co., Ltd., available from Marumoto Struers K.K.) is added to cold mounting resin (Cold mounting resin #105 (trade name), produced by Japan Composite Co., Ltd., available from Marumoto Struers K.K.), and the mixture is kneaded for 30 seconds. The resultant mixture (about 5 ml) is poured slowly to the sample container to a height of about 1 cm and allowed to stand still for 1 day to be coagulated. Next, the coagulated sample is taken out and the double-stick tape is peeled off. Then, a surface to be measured is polished with a polishing machine with a rotary polishing plate.

The polishing is performed so that the polishing surface is pressed against the rotary surface. The polishing plate is rotated at 1,000 rpm. The polishing is performed successively, using #500, #1000, and #2000 of the polishing plates in this order, and finally, mirror-surface polishing is performed, using alumina (BAIKALOX type 0.3CR (trade name) with a particle diameter of 0.3 μm, produced by BAIKOWSKI, available from Baikowski Japan).

The polished sample is fixed onto a preparation with clay and observed with a polarizing microscope (BX51, produced by Olympas Corporation).

[Polarizing Microscope Image Analysis Method]

The observation was performed at 200-fold magnification. An image observed with the polarizing microscope is photographed by connecting a CAMEDIA C-5050 ZOOM digital camera produced by Olympas Corporation to the polarizing microscope through an attachment. The shutter time is 1.6 seconds. Among the photographing data, images with 1,200×1,600 pixels were included in the analysis. It corresponds to investigation in a microscope field of 480 μm×540 μm. The image analysis was performed using ImageJ (National Institutes of Health) to judge blue portions, yellow portions, magenta portions and black portions.

The parameters defining each color when ImageJ was used are given below.

TABLE 1

|  | Hue value | Saturation value | Brightness value |
|---|---|---|---|
| Blue | 150 to 190 | 0 to 255 | 80 to 255 |
| Yellow | 235 to 255 | 0 to 255 | 80 to 255 |
| Magenta | 193 to 255 | 180 to 255 | 120 to 255 |
| Black | 0 to 255 | 0 to 255 | 0 to 120 |

The statistical processing with respect to the detected structures is performed using an external macro-file. The black portions, that is, portions corresponding not to optical structures but to resin are excluded from the analysis, and the area and aspect ratio of each of blue, yellow and magenta optical structures are to be calculated.

As mentioned above, there is natural graphite as a negative electrode material which has relatively large structures and a small crystal interplanar spacing (d002) to be described later. By pulverization, natural graphite turns to a scale-like one which appears superficially similar to the scale-like graphite of the present invention. However, there are many defects on the edge surface of the pulverized natural graphite particles. In contrast, the scale-like graphite of the present invention is characterized in having few defects on the edge surface of the particles and is also excellent in battery properties. Examples of the method for confirming the crystallinity on the edge surface of the particles include Raman spectrometry.

The Raman spectrum of the edge surface of the particles can be measured, for example, using NRS-5100 produced by JASCO Corporation, by observing not the smooth portions (basal surface) which are found predominantly but the edge surface portions selectively under the associated microscope.

When observing the particle edge surface of the scale-like graphite by a Raman microspectrophotometer, the peak in a range of 1300 to 1400 cm$^{-1}$ is based on sp3 bonds and the peak in a range of 1580 to 1620 cm$^{-1}$ is based on sp2 bonds.

In the scale-like graphite in a preferable embodiment of the present invention, the peak based on sp2 bonds is found to be higher compared to pulverized graphite particles. Specifically, when the edge surface of the particles of the scale-like graphite is measured by Raman spectrometer, the ratio $I_G/I_D$ (G value) between the peak area ($I_D$) in a range of 1300 to 1400 cm$^{-1}$ and the peak area ($I_G$) in a range of 1580 to 1620 cm$^{-1}$ observed by Raman spectroscopy spectra is from 5.2 to 100. G value is more preferably from 7.0 to 80 and still more preferably from 10 to 60. When the G value is too small, it promotes side reactions at the time of charge and discharge by the existence of many defects. By allowing the scale-like graphite to have an appropriate G value, it becomes a material which undergoes less self-discharge and degradation of a battery when it is held after charging.

The scale-like graphite in a preferable embodiment of the present invention has an average interplanar distance (002) by the X-ray diffraction method of 0.337 nm or less. This increases the amount of lithium ions to be intercalated and desorbed; i.e. increases the weight energy density. Further, a thickness Lc of the crystal in the C-axis direction is preferably 50 to 1,000 nm from the viewpoint of the weight energy density and easiness to be collapsed. When d002 is 0.337 nm or less, most of the optical structures observed by a polarizing microscope are found to be optically anisotropic.

d002 and Lc can be measured using a powder X-ray diffraction (XRD) method by a known method (see I. Noda and M. Inagaki, Japan Society for the Promotion of Science, 117th Committee material, 117-71-A-1 (1963), M. Inagaki et al., Japan Society for the Promotion of Science, 117th committee material, 117-121-C-5 (1972), M. Inagaki, "carbon", 1963, No. 36, pages 25-34).

In the preferred embodiment of the present invention, as pulverization is not performed after graphitization, a rhombohedral peak ratio is 5% or less, more preferably 1% or less.

When the graphite material falls in such ranges, an interlayer compound with lithium is formed smoothly. If the interlayer compound is used as a negative electrode material in a lithium secondary battery, the lithium occlusion/release reaction is hardly inhibited, which enhances a rapid charging/discharging characteristic.

It should be noted that the peak ratio (x) of the rhombohedral structure in graphite powder is obtained from actually measured peak strength (P1) of a hexagonal structure (100) plane and actually measured peak strength (P2) of a rhombohedral structure (101) plane by the following expression.

$x=P2/(P1+P2)$

In a preferred embodiment of the present invention, the BET specific surface area of the scale-like graphite is 0.4 m$^2$/g to 5 m$^2$/g, and more preferably 0.5 m$^2$/g to 3.5 m$^2$/g. By setting the BET specific surface area to be within the above-mentioned range, a wide area to be contacted with an electrolyte can be secured without excessive use of a binder and lithium ions can be smoothly intercalated and released, and thereby the reaction resistance of the battery can be lowered.

The BET specific surface area is measured by a common method of measuring the absorption and desorption amount of gas per mass. As a measuring device, for example, NOVA-1200 can be used.

It is preferred that the loose bulk density (0 tapping) of the scale-like graphite of the present invention be 0.7 g/cm$^3$ or more, and the powder density (tap density) when tapping is performed 400 times be 0.8 to 1.6 g/cm$^3$. The powder density is more preferably 0.9 to 1.6 g/cm$^3$, most preferably 1.1 to 1.6 g/cm$^3$.

The loose bulk density is obtained by dropping 100 g of the sample to a graduated cylinder from a height of 20 cm, and measuring the volume and mass without applying a vibration. The tap density is obtained by measuring the volume and mass of 100 g of powder tapped 400 times using an Autotap produced by Quantachrome Instruments.

These methods are based on ASTM B527 and JIS K5101-12-2, and the fall height of the Autotap in the tap density measurement is 5 mm.

By setting the loose bulk density to be 0.7 g/cm$^3$ or more, the electrode density before pressing at a time of application to an electrode can be enhanced further. Based on this value, it can be predicted whether or not a sufficient electrode density can be obtained by one roll pressing. Further, if the tap density is within the above-mentioned range, the electrode density achieved during pressing can be enhanced sufficiently.

The scale-like graphite in a preferred embodiment of the present invention may be the one in which part of carbon fiber adheres to the surface thereof. By allowing part of the carbon fiber to adhere to the surface of the scale-like graphite, the carbon fiber in an electrode is easily dispersed, and the cycle characteristic and the current load characteristic are further enhanced due to the synergetic effect of the carbon fiber in combination with the characteristics of the scale-like graphite serving as the core material.

Although the adhesion amount of the carbon fiber is not particularly limited, the adhesion amount is preferably 0.1 to 5 parts by mass in terms of 100 parts by mass of the scale-like graphite serving as a core.

Examples of the carbon fiber include: organic carbon fiber such as PAN-based carbon fiber, pitch-based carbon fiber, and rayon-based carbon fiber; and vapor-grown carbon fiber. Of those, particularly preferred is vapor-grown carbon fiber having high crystallinity and high heat conductivity. In the case of allowing the carbon fiber to adhere to the surfaces of the graphite particles, particularly preferred is vapor-grown carbon fiber.

Vapor-grown carbon fiber is, for example, produced by: using an organic compound as a material; introducing an organic transition metal compound as a catalyst into a high-temperature reaction furnace with a carrier gas to form fiber; and then conducting heat treatment (see, for example, JP 60-54998 A and JP 2778434 B2). The vapor-grown carbon fiber has a fiber diameter of 2 to 1,000 nm, preferably 10 to 500 nm, and has an aspect ratio of preferably 10 to 15,000.

Examples of the organic compound serving as a material for carbon fiber include toluene, benzene, naphthalene, ethylene, acetylene, ethane, natural gas, a gas of carbon monoxide or the like, and a mixture thereof. Of those, an aromatic hydrocarbon such as toluene or benzene is preferred.

The organic transition metal compound includes a transition metal serving as a catalyst. Examples of the transition metal include metals of Groups IVa, Va, VIa, VIIa, and VIII of the periodic table. Preferred examples of the organic transition metal compound include compounds such as ferrocene and nickelocene.

The carbon fiber may be obtained by pulverizing or shredding long fiber obtained by vapor deposition or the like. Further, the carbon fiber may be agglomerated in a flock-like manner.

Carbon fiber which has no pyrolyzate derived from an organic compound or the like adhering to the surface thereof or carbon fiber which has a carbon structure with high crystallinity is preferred.

The carbon fiber with no pyrolyzate adhering thereto or the carbon fiber having a carbon structure with high crystallinity can be obtained, for example, by sintering (heat-treating) carbon fiber, preferably, vapor-grown carbon fiber in an inactive gas atmosphere. Specifically, the carbon fiber with no pyrolyzate adhering thereto is obtained by heat treatment in inactive gas such as argon at about 800° C. to 1,500° C. Further, the carbon fiber having a carbon structure with high crystallinity is obtained by heat treatment in inactive gas such as argon preferably at 2,000° C. or more, more preferably 2,000° C. to 3,000° C.

It is preferred that the carbon fiber contains branched fiber. Further, the fiber as a whole may have a portion having hollow structures communicated with each other. For this reason, carbon layers forming a cylindrical portion of the fiber are formed continuously. The hollow structure refers to a structure in which a carbon layer is wound in a cylindrical shape and includes an incomplete cylindrical structure, a structure having a partially cut part, two stacked carbon layers connected into one layer, and the like. Further, the cross-section is not limited to a complete circular cross-section, and the cross-section of the cylinder includes an oval cross-section or a polygonal cross-section.

Further, the average interplanar spacing d002 of a (002) plane by the X-ray diffraction method of the carbon fiber is preferably 0.344 nm or less, more preferably 0.339 nm or less, particularly preferably 0.338 nm or less. Further, it is preferred that a thickness ($L_c$) in a C-axis direction of crystal is 40 nm or less.

(2) Method for Producing a Scale-Like Graphite

The scale-like graphite in a preferable embodiment of the present invention can be produced by mixing the particles obtained by pulverizing calcined coke and the particles obtained by pulverizing petroleum pitch or coal-tar pitch, and subjecting the mixture to heat treatment at a temperature of from 2,400° C. to 3,600° C.

As a raw material of calcined coke, for example, petroleum pitch, coal pitch, coal pitch coke, petroleum coke and the mixture thereof can be used. Among these, preferred is the coke obtained by a delayed coking process under specific conditions and the subsequent heating under an inert atmosphere.

Examples of raw materials to pass through a delayed coker include decant oil which is obtained by removing a solvent after the process of fluid catalytic cracking to heavy distillate at the time of crude refining, and tar obtained by distilling coal tar extracted from bituminous coal and the like at a temperature of 200° C. or more and heating it to 100° C. or more to impart sufficient flowability. It is desirable that these liquids are heated to 450° C. or more, or even 510° C. or more, during the delayed coking process, at least at an inlet of the coking drum in order to increase the residual ratio of the coke at the time of calcination. Also, pressure inside the drum is kept at preferably an ordinary pressure or higher, more preferably 300 kPa or higher, still more preferably 400 kPa or higher to increase the capacity of a negative electrode. As described above, by performing coking under more severe conditions than usual, the reaction of the liquids is further enhanced and coke having a higher degree of polymerization can be obtained.

The obtained coke is to be cut out from the drum by water jetting, and roughly pulverized to lumps about the size of 5 centimeters with a hammer and the like. A double roll crusher and a jaw crusher can be used for the rough pulverization, and it is desirable to pulverize the coke so that the particles larger than 1 mm in size account for 90 mass % or more of the powder. If the coke is pulverized too much to generate a large amount of fine powder having a diameter of 1 mm or less, problems such as the dust stirred up after drying and the increase in burnouts may arise in the subsequent processes such as heating.

Next, the roughly pulverized coke is subjected to calcination. The calcination means to perform heating to remove moisture and volatile organic.

The coke before calcination is relatively flammable. Therefore, the coke is to be soaked with water to prevent fires. The coke soaked with water contaminates equipment and surrounding space with muddy fine powder containing water, and is inferior in handleability. Calcination can provide significant advantage in terms of handleability. Also, when the calcined coke is subjected to graphitization, it promotes the development of crystals.

The calcination is performed by electric heating and flame heating of LPG, LNG, heating oil and heavy oil. Since a heat source of 2,000° C. or less is sufficient to remove moisture and organic volatile, flame heating as an inexpensive heat source is preferable for mass production. When the treatment is performed on a particularly-large scale, energy cost can be reduced by an inner-flame or inner-heating type heating of coke while burning fuel and the organic volatile contained in the unheated coke in a rotary kiln.

It is desirable that the area and aspect ratio of a specific optical structure of the calcined coke are within a specific range. The area and aspect ratio of an optical structure can be calculated by the above-mentioned method. Also, when the calcined coke is obtained as a lump of a few centimeters in size, the lump as produced is embedded in resin and subjected to mirror-like finishing and the like, and the cross-section is observed by a polarizing microscope to calculate the area and aspect ratio of an optical structure.

In the case where the optical structures are observed in a rectangular field of 480 µm×540 µm in the cross-section of the calcined coke under a polarizing microscope, when areas of the optical structures are accumulated from the smallest structure in an ascending order, an area of an optical structure whose accumulated area corresponds to 60% of the total area of all the optical structures is preferably 10 µm$^2$ to 5,000 µm$^2$, more preferably 10 µm$^2$ to 1,000 µm$^2$, and still more preferably 20 µm$^2$ to 500 µm$^2$. When the calcined coke having the area of an optical structure within the above-mentioned range is graphitized, the graphite is going to have a fully developed crystal structure and can retain lithium ions at a higher density. Also, as the crystals develop in a more aligned state and the fracture surfaces of the crystals slide over each other, the calcined coke has a higher degree of freedom for the particle shape when an electrode is pressed, which improves filling property and is preferable.

In the case where the optical structure is observed in the same way as described above, when the optical structures are counted from a structure of the smallest aspect ratio in an ascending order of, the aspect ratio of the structure which ranks at the position of 60% in the total number of all the structures is preferably 1.5 to 6.

Next, the calcined coke is to be pulverized.

There is not particular limit to the method of pulverization, and pulverization can be performed using a known jet mill, hammer mill, roller mill, pin mill, vibration mill or the like.

It is desirable to perform pulverization so that coke has an average particle diameter based on a volume (D50) of from 1 µm to 50 µm. To perform pulverization to make D50 less than 1 µm, it requires use of specific equipment and a large amount of energy. When D50 is too large, the lithium ion diffusion takes time when the coke is made into an electrode and it is likely to reduce the charge and discharge rate. D50 is more preferably from 5 µm to 35 µm. Considering that fine powder has a large surface area and is likely to give rise to an unintended reaction, D50 is more preferably 10 µm or more. When the scale-like graphite is for use in the power source of the drive force and the like required generating a large current, D50 is preferably 25 µm or less.

In the pulverized calcined coke, lattice defects are generated on the fracture face parallel to c-axis (particle edge surface). When the coke is graphitized with the lattice defects left in it, many highly-reactive defects will be generated on the particle edge surface. When the portion is measured by Raman microspectrometer, the ratio $I_G/I_D$ (G value) between the peak area ($I_D$) in a range of 1300 to 1400 $cm^{-1}$ and the peak area ($I_G$) in a range of 1580 to 1620 $cm^{-1}$ observed by Raman spectroscopy spectra becomes lower. Here, $I_D$ and $I_G$ are an index showing the abundance of SP3 bonds and SP2 bonds, respectively, the lower G value as the ratio between them means that there are many defects on the particle edge surface.

When there are many defects on the particle edge surface, the particles become highly responsive to the electrolyte composition and consume much electricity in the initial charge: i.e. at the time of the lithium ion intercalation, which results in forming an excessively thick coating. As a result, it inhibits reversible lithium intercalation and release reaction of lithium ions and may adversely effect on the battery life such as cycle characteristics. Therefore, in the particle edge surface, the status having fewer defects: i.e. the status with a high G value is desirable.

In order to inhibit formation of defects at the time of graphitizing the pulverized calcined coke, the particles obtained by pulverizing a defect repairing material selected from petroleum pitch or coal-tar pitch may be mixed into the coke before graphitization. By performing the operation, the defects on the fracture surface (particle edge surface) generated by the pulverization are repaired through the graphitization treatment and a material having few defects on the particle edge surface can be obtained.

Mixing of the particles obtained by pulverizing the calcined coke and the above-mentioned particles obtained by pulverizing a defect repairing material may be mixed either by a wet method or a dry method.

When the mixing is performed by a wet method, for example, it the defect repairing material is dissolved or dispersed in a solvent and after adding the calcined coke there to, the solvent can be removed by drying. Note that an organic solvent is used in a wet method, which requires careful handling, and it is necessary to prevent the solvent from evaporation and to collect the solvent. Therefore, it is desirable to perform the mixing in a dry method in which a solvent is not used.

When the mixing is performed in a dry method, it is desirable to perform the mixing with a certain force that will hardly pulverize the particles obtained by pulverizing the calcined coke in order to make sure that the particles obtained by pulverizing calcined coke and the particles obtained by the defect repairing material are fully mixed. For mixing, in addition to a mixer having a small pulverizing power such as a planetary and centrifugal mixer, a planetary mixer and a Henschel mixer, a mixer with a detuned pulverization performance by controlling the liner part, blades and number of rotations of a hammer mill, a impeller mill and the like can be suitably used. Among these, a hammer mill and an impeller mill have a high mixing power and suitable for performing a dry-method coating continuously in a short time. In mixing by a dry method, a smooth film owing to the defect repairing material is not formed in some cases. However, the defect repairing material is softened by the heating for the graphitization, spreads over the surface of the particles obtained by pulverizing the calcined coke and becomes a smooth film.

The average particle diameter based on a volume by laser diffraction method of the particles obtained by pulverizing petroleum pitch or coal-tar pitch (D50) is smaller than that of the particles obtained by pulverizing calcined coke (D50) and is preferably 0.01 µm to 25 µm. Making the particle diameter of the defect repairing material excessively small not only causes the agglomeration of particles but also could cause dust explosion. D50 is more preferably 0.5 µm or more and still more preferably 1.0 µm or more. To make the formed film more uniform and denser, D50 is preferably 10 µm or less and more preferably 5 µm or less.

When (D50)Dc represents the average particle diameter of the particles obtained by pulverizing calcined coke and (D50)Dp represents that of the particles obtained by pulverizing petroleum pitch or coal-tar pitch, setting Dc/Dp value from 1.5 or more and less than 200 enables forming a more uniform film and is desirable. When the Dc/Dp value is too large, special equipment and a large amount of energy are required to prepare extremely small defect particles of a defect repairing material, and furthermore, there may be a decrease in the defect-repairing performance due to a decrease in an amount of the particles of a defect repairing material to be deposited. Dc/Dp is preferably 50 or less and more preferably 15 or less. Considering the balance between the amount of the particles obtained by pulverizing the calcined coke and the amount of the particles of the defect repairing material to be deposited thereon, Dc/Dp is preferably 3 or more and more preferably 8 or more.

The compounding ratio of the particles obtained by pulverizing the defect repairing material is preferably 0.5 mass % or more and 15 mass % or less of the total mass of the particles obtained by pulverizing the calcined coke and the particles obtained by pulverizing the defect repairing material from the viewpoint of the volume energy density of an electrode. The compounding ratio is more preferably 1 mass % or more and 5 mass % or less from the viewpoint of high-rate charge and discharge, and still more preferably 1.2 mass % or more and 2.5 mass % or less from the viewpoint of the weight energy density.

After performing the dry method mixing as mentioned above in the pulverized calcined coke, it can be graphitized by heating. By this treatment, the defect repairing material itself can be graphitized as well. In the case where a defect repairing material is not blended, defects are generated on the particle edge surface by the graphitization. In contrast, in the case where the calcined coke is graphitized after being mixed with a defect repairing material, the defects existing on the particle edge surface and the like are repaired and a material having few defects can be obtained, although details of the mechanism are not known.

To change the properties of a scale-like graphite as a negative electrode material, forming carbon having low crystallinity on the surface of graphite has been conventionally implemented by coating a material before carbonization onto the surface of graphite and subjecting the graphite to carbonization. The present invention is intended to reduce defects on the particle edge surface by mixing of a defect repairing material: i.e. to improve the degree of crystallinity of the particle edge surface. This has an effect of reducing side reactions of the battery. By carbonizing or graphitizing the pulverized calcined coke and a defect repairing material at the same time, not only that the process can be simplified compared to the conventional method in which a carbonization process was provided separately after the coating process, but also a scale-like graphite having few defects particularly on a particle edge surface can be obtained.

As the thus-obtained scale-like graphite has a high degree of crystallinity over the entire structure, good filling property in the electrode as well as the property inhibiting side reactions due to few defects on a particle edge surface can be achieved, which have been hard to balance.

Graphitization is performed at a temperature of 2,400° C. or higher, more preferably 2,800° C. or higher, and still more preferably 3,050° C. or higher, and the most preferably 3,150° C. or higher. The treatment at a higher temperature further promotes the development of the graphite crystals and an electrode having a higher storage capacity of lithium ion can be obtained. On the other hand, if the temperature is too high, it is difficult to prevent the sublimation of the carbon material and an unduly large amount of energy is required. Therefore, the graphitization is preferably 3,600° C. or lower.

It is desirable to use electric energy to attain the above temperature. Electric energy is more expensive than other heat source and in particular to attain a temperature of 2,000° C. or higher, an extremely large amount of electricity is consumed. Therefore, it is preferable not to consume the electric energy except for graphitization, and to calcine the carbon material prior to the graphitization to remove the organic volatile content: i.e. to make the fixed carbon content be 95% or more, preferably 98% or more, and still more preferably 99% or more.

The graphitization treatment is conventionally carried out under atmosphere without containing oxygen, for example, in a nitrogen-sealed environment and an argon-sealed environment. In contrast, in the present invention, it is preferable to perform the graphitization treatment in an environment with a certain concentration of oxygen.

There is no limitation on the graphitization treatment as long as it is performed in an environment with a certain oxygen concentration. The treatment can be carried out, for example, by a method of putting a material to be graphitized in a graphite crucible without closing the lid in an Acheson furnace filled with a filler of carbon particles or graphite particles; and generating heat by passing a current through the carbon material in a state that the top of the material is in contact with an oxygen-containing gas to thereby carry out graphitization. In this case, in order to prevent the substances contained in the material to be graphitized from reacting explosively, or to prevent the explosively-reacted materials from being blown off, the crucible may be lightly shut off from the oxygen-containing gas by covering the top of the crucible with a carbonized or graphitized felt and porous plate. A small amount of argon or nitrogen may be allowed to flow into the furnace, however, it is preferable not to substitute the atmosphere completely with argon or nitrogen but to adjust the oxygen concentration in the vicinity of the surface of the material to be graphitized (within 5 cm) to 1% or more, preferably 1 to 5% in the graphitization process. As an oxygen-containing gas, air is preferable but a low-oxygen gas in which the oxygen concentration is lowered to the above-mentioned level may be used as well. Using argon and nitrogen in a large amount requires energy for condensing the gas, and if the gas is circulated, the heat required for the graphitization is to be exhausted out of the system and further energy is to be required. From this viewpoint, it is preferable to perform the graphitization in an environment open to the atmosphere.

However, when the graphitization is carried out as described above, an impurity component derived from the material to be graphitized is likely to precipitate in the region being in contact with oxygen, and it is desirable to remove it. Examples of the method for removing the impurity include a method of removing the above-mentioned material in the region from the position being in contact with an oxygen-containing air to a predetermined depth. That is, the graphite material underlying deeper than the above position is obtained. A determined depth is 2 cm, preferably 3 cm and more preferably 5 cm from the surface.

The material underlying deeper has few chances to be in contact with oxygen. It is preferable to obtain a graphite material within 2 m from the portion being contact with the oxygen-containing gas, more preferably within 1 m, and more preferably within 50 cm.

Efforts have been made to improve the battery properties by controlling the crystallinity on the particle edge surface by the addition of a boron compound at the time of graphitization to thereby increase SP3 bonds and increase defects uniformly. In contrast, in the present invention, the crystallinity (G value) is increased by performing graphitization through the action of a defect repairing material on the particle edge surface. Therefore, the scale-like graphite does not contain boron and is preferable.

In a preferable embodiment of the present invention, as the generation of defects on the particle edge surface is inhibited by graphitization, the material is not subjected to pulverizing treatment after graphitization. Note that the material may be pulverized within limits that do not pulverize the particles after the graphitization.

The present invention exerts a great repairing effect when the pulverized calcined coke is graphitized. Accordingly, it may not be fully effective in some cases when a highly-graphitized material is used instead of calcined coke.

In the case where a part of carbon fiber is allowed to adhere to the surface of the scale-like graphite, the adhesion method is not particularly limited. Examples of the methods include a method of mixing the obtained scale-like graphite and carbon fiber by a mechanochemical method with a Mechanofusion produced by Hosokawa Micron Corporation, and a method of mixing carbon fiber into the pulverized calcined coke and pulverized defect repairing material to be well dispersed and next subjected to graphitization treatment.

(3) Carbon Material for Battery Electrodes

The carbon material for battery electrodes in a preferred embodiment of the present invention contains the above-mentioned scale-like graphite. By using the carbon material for battery electrodes of the present invention, a battery electrode can be obtained which has an excellent charge and discharge reversibility and a small change rate in an electrode thickness when a secondary battery is fabricated, while maintaining a high capacity, a high coulomb efficiency and high cycle characteristics.

The carbon material for battery electrodes in a preferred embodiment of the present invention contains the above-mentioned scale-like graphite. When the above-mentioned carbon material is used as a battery electrode, battery electrode having a high energy density can be obtained, while maintaining a high capacity, a high coulomb efficiency and high cycle characteristics.

The carbon material for a battery electrode may be used as, for example, a negative electrode active material and an agent for imparting conductivity to a negative electrode of a lithium ion secondary battery.

The carbon material for battery electrodes in a preferred embodiment of the present invention may comprise the above-mentioned scale-like graphite only. It is also possible to use the materials obtained by blending spherical natural or artificial graphite having d002 of 0.3370 nm or less in an amount of 0.01 to 200 parts by mass and preferably 0.01 to 100 parts by mass; or by blending natural or artificial graphite (for example, graphite having a scale shape) having d002 of 0.3370 nm or less and aspect ratio of 2 to 100 in an amount of 0.01 to 120 parts by mass and preferably 0.01 to 100 parts by mass based on 100 parts by mass of the scale-like graphite. By using the graphite material mixed with other graphite materials, the graphite material can be added with excellent properties of other graphite materials while maintaining the excellent characteristics of the scale-like graphite in a preferred embodiment of the present invention. With respect to mixing of these materials, the blending amount can be determined by appropriately selecting the materials to be mixed depending on the required battery characteristics.

Carbon fiber may also be mixed with the carbon material for battery electrodes. As the carbon fiber, carbon fiber similar to the carbon fiber described above may be used. The mixing amount is 0.01 to 20 parts by mass, preferably 0.5 to 5 parts by mass in terms of total 100 parts by mass of the above-mentioned graphite material.

(4) Paste for Electrodes

The paste for an electrode of the present invention contains the above-mentioned carbon material for a battery electrode and a binder. The paste for an electrode can be obtained by kneading the carbon material for a battery electrode with a binder. A known device such as a ribbon mixer, a screw-type kneader, a Spartan Granulator, a Loedige Mixer, a planetary mixer, or a universal mixer may be used for kneading. The paste for an electrode may be formed into a sheet shape, a pellet shape, or the like.

Examples of the binder to be used for the paste for an electrode include known binders such as: fluorine-based polymers such as polyvinylidene fluoride and polytetrafluoroethylene; and rubber-based binders such as styrene-butadiene rubber (SBR).

The appropriate use amount of the binder is 1 to 30 parts by mass in terms of 100 parts by mass of the carbon material for a battery electrode, and in particular, the use amount is preferably about 3 to 20 parts by mass.

A solvent can be used at a time of kneading. Examples of the solvent include known solvents suitable for the respective binders such as: toluene and N-methylpyrolidone in the case of a fluorine-based polymer; water in the case of SBR; dimethylformamide; and isopropanol. In the case of the binder using water as a solvent, it is preferred to use a thickener together. The amount of the solvent is adjusted so as to obtain a viscosity at which a paste can be applied to a current collector easily.

(5) Electrode

An electrode in a preferred embodiment of the present invention is formed of a molding of the above-mentioned paste for an electrode. The electrode is obtained, for example, by applying the paste for an electrode to a current collector, followed by drying and pressure molding.

Examples of the current collector include foils and mesh of aluminum, nickel, copper, stainless steel and the like. The coating thickness of the paste is generally 50 to 200 µm. When the coating thickness becomes too large, a negative electrode may not be placed in a standardized battery container. There is no particular limitation to the paste coating method, and an example of the coating method includes a method involving coating with a doctor blade or a bar coater, followed by molding with roll pressing or the like.

Examples of the pressure molding include roll pressure molding, compression molding, and the like. The pressure for the pressure molding is preferably about 1 to 3 t/cm$^2$. As the electrode density of the electrode increases, the battery capacity per volume generally increases. However, if the electrode density is increased too much, the cycle characteristic is generally degraded. If the paste for an electrode in a preferred embodiment of the present invention is used, the degradation in the cycle characteristic is small even when the electrode density is increased. Therefore, an electrode having the high electrode density can be obtained. The maximum value of the electrode density of the electrode obtained using the paste for an electrode in a preferred embodiment of the present invention is generally 1.7 to 1.9 g/cm$^3$. The electrode thus obtained is suitable for a negative electrode of a battery, in particular, a negative electrode of a secondary battery.

(6) Battery, Secondary Battery

A battery or a secondary battery can be produced, using the above-mentioned electrode as a constituent element (preferably, as a negative electrode).

The battery or secondary battery in a preferred embodiment of the present invention is described by taking a lithium ion secondary battery as a specific example. The lithium ion secondary battery has a structure in which a positive electrode and a negative electrode are soaked in an electrolytic solution or an electrolyte. As the negative electrode, the electrode in a preferred embodiment of the present invention is used.

In the positive electrode of the lithium ion secondary battery, a transition metal oxide containing lithium is generally used as a positive electrode active material, and preferably, an oxide mainly containing lithium and at least one kind of transition metal element selected from the group consisting of Ti, V, Cr, Mn, Fe, Co, Ni, Mo, and W, which is a compound having a molar ratio of lithium to a transition metal element of 0.3 to 2.2, is used. More preferably, an oxide mainly containing lithium and at least one kind of transition metal element selected from the group consisting of V, Cr, Mn, Fe, Co and Ni, which is a compound having a molar ratio of lithium to a transition metal element of 0.3 to 2.2, is used. It should be noted that Al, Ga, In, Ge, Sn, Pb, Sb, Bi, Si, P, B, and the like may be contained in a range of less than 30% by mole with respect to the mainly present transition metal. Of the above-mentioned positive electrode active materials, it is preferred that at least one kind of material having a spinel structure represented by a general formula Li$_x$MO$_2$ (M represents at least one kind of Co, Ni, Fe, and Mn, and x is 0 to 1.2), or Li$_y$N$_2$O$_4$ (N contains at least Mn, and y is 0 to 2) be used.

Further, as the positive electrode active material, there may be particularly preferably used at least one kind of materials each including Li$_y$M$_a$D$_{1-a}$O$_2$ (M represents at least one kind of Co, Ni, Fe, and Mn, D represents at least one kind of Co, Ni, Fe, Mn, Al, Zn, Cu, Mo, Ag, W, Ga, In, Sn, Pb, Sb, Sr, B, and P with the proviso that the element corresponding to M being excluded, y=0 to 1.2, and a=0.5 to 1) or materials each having a spinel structure represented by Li$_z$(N$_b$E$_{1-b}$)$_2$O$_4$ (N represents Mn, E represents at least one kind of Co, Ni, Fe, Mn, Al, Zn, Cu, Mo, Ag, W, Ga, In, Sn, Pb, Sb, Sr, B and P, b=1 to 0.2, and z=0 to 2).

Specifically, there are exemplified Li$_x$CoO$_2$, Li$_x$NiO$_2$, Li$_x$MnO$_2$, Li$_x$Co$_a$Ni$_{1-a}$O$_2$, Li$_x$Co$_b$V$_{1-b}$Oz, Li$_x$Co$_b$Fe$_{1-b}$O$_2$, Li$_x$Mn$_2$O$_4$, Li$_x$Mn$_c$Co$_{2-c}$O$_4$, Li$_x$Mn$_c$Ni$_{2-c}$O$_4$, Li$_x$Mn$_c$V$_{2-c}$O$_4$, and Li$_x$Mn$_c$Fe$_{2-c}$O$_4$ (where, x=0.02 to 1.2, a=0.1 to 0.9, b=0.8 to 0.98, c=1.6 to 1.96, and z=2.01 to 2.3).

As the most preferred transition metal oxide containing lithium, there are given $Li_xCoO_2$, $Li_xNiO_2$, $Li_xMnO_2$, $Li_xCo_aNi_{1-a}O_2$, $Li_xMn_2O_4$, and $Li_xCo_bV_{1-b}O_z$ (x=0.02 to 1.2, a=0.1 to 0.9, b=0.9 to 0.98, and z=2.01 to 2.3). It should be noted that the value of x is a value before starting charge and discharge, and the value increases and decreases in accordance with charge and discharge.

Although the average particle size of the positive electrode active material is not particularly limited, the size is preferably 0.1 to 50 µm. It is preferred that the volume of the particles of 0.5 to 30 µm be 95% or more. It is more preferred that the volume occupied by the particle group with a particle diameter of 3 µm or less be 18% or less of the total volume, and the volume occupied by the particle group of 15 µm or more and 25 µm or less be 18% or less of the total volume.

Although the specific area is not particularly limited, the area is preferably 0.01 to 50 $m^2/g$, particularly preferably 0.2 $m^2/g$ to 1 $m^2/g$ by a BET method. Further, it is preferred that the pH of a supernatant obtained when 5 g of the positive electrode active material is dissolved in 100 ml of distilled water be 7 or more and 12 or less.

In a lithium ion secondary battery, a separator may be provided between a positive electrode and a negative electrode. Examples of the separator include non-woven fabric, cloth, and a microporous film each mainly containing polyolefin such as polyethylene and polypropylene, a combination thereof, and the like.

As an electrolytic solution and an electrolyte forming the lithium ion secondary battery in a preferred embodiment of the present invention, a known organic electrolytic solution, inorganic solid electrolyte, and polymer solid electrolyte may be used, but an organic electrolytic solution is preferred in terms of electric conductivity.

As an organic electrolytic solution (non-aqueous solvent), preferred is a solution of an organic solvent such as: an ether such as diethyl ether, dibutyl ether, ethylene glycol monomethyl ether, ethylene glycol monoethyl ether, ethylene glycol monobutyl ether, diethylene glycol monomethyl ether, diethylene glycol monoethyl ether, diethylene glycol monobutyl ether, diethylene glycol dimethyl ether, or ethylene glycol phenyl ether; an amide such as formamide, N-methylformamide, N,N-dimethylformamide, N-ethylformamide, N,N-diethylformamide, N-methylacetamide, N,N-dimethylacetamide, N-ethylacetamide, N,N-diethylacetamide, N,N-dimethylpropionamide, or hexamethylphosphorylamide; a sulfur-containing compound such as dimethylsulfoxide or sulfolane; a dialkyl ketone such as methyl ethyl ketone or methyl isobutyl ketone; a cyclic ether such as ethylene oxide, propylene oxide, tetrahydrofuran, 2-methoxytetrahydrofuran, 1,2-dimethoxyethane, or 1,3-dioxolan; a carbonate such as ethylene carbonate or propylene carbonate; γ-butyrolactone; N-methylpyrrolidone; acetonitrile; nitromethane; or the like. There are more preferably exemplified: esters such as ethylene carbonate, butylene carbonate, diethyl carbonate, dimethyl carbonate, propylene carbonate, vinylene carbonate, and γ-butyrolactone; ethers such as dioxolan, diethyl ether, and diethoxyethane; dimethylsulfoxide; acetonitrile; tetrahydrofuran; and the like. A carbonate-based nonaqueous solvent such as ethylene carbonate or propylene carbonate may be particularly preferably used. One kind of those solvents may be used alone, or two or more kinds thereof may be used as a mixture.

A lithium salt is used for a solute (electrolyte) of each of those solvents. Examples of a generally known lithium salt include $LiClO_4$, $LiBF_4$, $LiPF_6$, $LiAlCl_4$, $LiSbF_6$, LiSCN, LiCl, $LiCF_3SO_3$, $LiCF_3CO_2$, $LiN(CF_3SO_2)_2$, and the like.

Examples of the polymer solid electrolyte include a polyethylene oxide derivative and a polymer containing the derivative, a polypropylene oxide derivative and a polymer containing the derivative, a phosphoric acid ester polymer, a polycarbonate derivative and a polymer containing the derivative, and the like.

It should be noted that there is no constraint for the selection of members required for the battery configuration other than the aforementioned members.

EXAMPLES

Hereinafter, the present invention is described in more detail by way of typical examples. It should be noted that these examples are merely for illustrative purposes, and the present invention is not limited thereto.

It should be noted that, as for the scale-like graphites of Examples and Comparative Examples, observation and data analysis with respect to optical structures, average interplanar spacing (d002) by an X-ray diffraction method, G values, and BET specific surface area are measured by the method described in detail in the "Mode for carrying out the Invention" of the specification. Further, the methods for measuring other physical properties are given below.

(1) Average Particle Diameter (D50)

The average particle diameter based on a volume (D50) was determined using Mastersizer produced by Malvern Instruments Ltd. as a laser diffraction type measurement device of particle size distribution.

(2) Method for Evaluating Batteries (a) Production of Paste:

To one part by mass of a scale-like graphite, 0.1 part by mass of KF polymer L1320 produced by Kureha Corporation (N-methylpyrrolidone (NMP) solution containing 12% by mass of polyvinylidene fluoride (PVDF)) is added, and the mixture is kneaded by a planetary mixer to obtain a main undiluted solution.

(b) Production of an Electrode:

NMP is added to the main undiluted solution and the viscosity thereof is adjusted. After that, the resultant solution is applied to a high-purity copper foil to a thickness of 250 µm using a doctor blade. The high-purity copper foil thus obtained is dried in vacuum at 120° C. for 1 hour and punched into a size of 18 mmΦ. The electrode thus punched out is sandwiched between pressing plates made of supersteel and pressed so that a press pressure becomes about $1 \times 10^2$ to $3 \times 10^2$ $N/mm^2$ ($1 \times 10^3$ to $3 \times 10^3$ $kg/cm^2$) with respect to the electrode. Then, the electrode is dried in a vacuum drier at 120° C. for 12 hours to obtain an electrode for evaluation.

(c) Production of a Battery:

A three-electrode cell is produced as follows. The following operation is performed in a dry argon atmosphere at a dew point of −80° C. or less.

In a cell (inner diameter: about 18 mm) with a screwed-type lid made of polypropylene, the carbon electrode (negative electrode) with a copper foil produced in the above-mentioned item (2) and a metal lithium foil (positive electrode) are sandwiched and stacked between separators (microporous films made of polypropylene (Cell Guard 2400)). Further, metal lithium for reference (reference electrode) is stacked in the same way. An electrolyte described in below (d) is added to the resultant to obtain a cell for testing.

(d) Electrolyte: In a mixed solution of 8 parts by mass of ethylene carbonate (EC) and 12 parts by mass of diethyl carbonate (DEC), 1 mol/liter of $LiPF_6$ is dissolved as an electrolyte.

(e) Initial Charge and Discharge Efficiency and a Discharge Capacity:

Regarding charging (insertion of lithium into carbon), constant current (CC) charging is performed at 0.2 mA/cm$^2$ from a rest potential to 0.002 V. Next, the charging is switched to constant voltage (CV) charging at 0.002 V and stopped when a current value drops to 25.4 µA.

A constant-current and constant-voltage discharge test is performed at a current density of 0.4 mA/cm$^2$ (corresponding to 0.2 C) and 10 mA/cm$^2$ (corresponding to 5 C). The test is performed in a thermostat bath set at 25° C. At that time, the ratio of the electricity of the initial charge and discharge, i.e. discharge electricity/charge electricity in percentage was defined as an index of the initial charge and discharge efficiency.

The discharge capacity was calculated by dividing the discharge electricity at 0.4 mA/cm$^2$ (corresponding to 0.2 C) by the active substance mass per unit area.

(f) Charge/Discharge Cycle Capacity Keeping Ratio (150 Cycles):

A constant-current and constant-voltage charge/discharge test is performed at a current density of 2 mA/cm$^2$ (corresponding to 1 C).

Regarding charging (insertion of lithium into carbon), constant current (CC) charging is performed at 0.2 mA/cm$^2$ from a rest potential to 0.002 V. Next, the charging is switched to constant voltage (CV) charging at 0.002 V and stopped when a current value drops to 25.4 µA.

Regarding discharging (discharge from carbon), CC discharging is performed at a predetermined current density and cut off at a voltage of 1.5 V. Further, the measurement is performed in a thermostat bath set at 60° C., and charge/discharge is repeated 150 cycles.

(g) Capacity Ratio of the Rate Characteristics Test at a Low Temperature

Charge was performed at 25° C. under the above-mentioned conditions. Discharge was performed in a thermostat bath set at −20° C. Discharge capacity at −20° C./discharge capacity at 25° C. was calculated and defined as an index of the capacity ratio of the rate characteristics test at a low temperature.

(h) Change Rate of the Electrode Thickness (T500/T10) after Repeating 500 Cycles of Charge and Discharge After fabricating each of scale-like graphite into a battery by the methods described in above (a) to (d), the electrode thickness (T10) in a discharge state after performing 10 cycles of initial aging at 1 C was measured. Subsequently, the electrode thickness (T500) in a discharge state after repeating 500 cycles of charge and discharge at 1 C was measured to calculate the change rate of the electrode thickness (T500/T10). The results are shown in Table 2.

The T500/T10 value does not fall below 1.0 if there is no measurement error. The higher value means high irreversibility in charge and discharge reaction of the battery. In a battery having high reversibility in charge and discharge reaction, T500/T10 value is preferably 1.30 or less, more preferably 1.20 or less and still more preferably 1.10 or less. The electrode having such a preferable change rate of the electrode thickness can be suitably used for a large-size battery requiring a longer operating life.

Example 1

A crude oil produced in Liaoning, China (28°API, wax content of 17% and sulfur content of 0.66%) was distilled under ordinary pressure. Using a Y-type zeolite catalyst in a sufficient amount against the heavy distillate, fluid catalytic cracking was performed at 510° C. under ordinary pressure. A solid content such as a catalyst was centrifuged until the obtained oil became clear to thereby obtain decant oil 1. The oil was subjected to a small-sized delayed coking process. After keeping the drum inlet temperature at 505° C. and the drum internal pressure to 600 kPa (6 kgf/cm$^2$) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled by water-cooling the outside thereof in an SUS container, while it was sealed from the air and nitrogen as required was introduced so that the inside the container is not subjected to negative pressure. A black and slightly gray block sample up to 2 cm in size was obtained as calcined coke 1.

Calcined coke 1 was observed under a polarizing microscope for the image analysis. As a result of the measurement, when areas of the optical structures are accumulated from the smallest structure in an ascending order, an area of a structure whose accumulated area corresponds to 60% of the total area was 47.4 µm$^2$. When the detected particles are arranged from the particle of the smallest aspect ratio in an ascending order, the aspect ratio of the particle which ranks at the position of 60% in the total number of all the particles was 2.66.

Calcined coke 1 was pulverized with a bantam mill produced by Hosokawa Micron Corporation and subsequently coarse powder was excluded with a sieve having a mesh size of 32 µm. Next, the pulverized coke is subjected to air-flow screening with Turboclassifier TC-15N produced by Nisshin Engineering Inc. to obtain a powder calcined coke 1, wherein D50 is 19.3 µm, substantially containing no particles each having a particle diameter of 1.0 µm or less.

98.5 g of the obtained powder calcined coke was mixed with 1.5 g of isotropic coal pitch (softening point of 130° C., remaining coal rate of 60%) having a D50 value of 3.1 µm and substantially containing no particles each having a particle diameter of 20 µm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced as described above and the cycle characteristics and the like were measured. Table 2 shows the results.

FIG. 1 shows an SEM image photograph of the scale-like graphite. The portion indicated by "E" corresponds to the edge surface of the particle and the portion indicated by "B" corresponds to the basal surface of the particle.

Example 2

Coal tar derived from bituminous coal was distilled at 320° C. under ordinary pressure and distillate of the distillation temperature or lower was removed. From the obtained tar having a softening point of 30° C., the insoluble matter was removed by filtration at 100° C. to obtain viscous liquid 1. The liquid was subjected to a small-sized delayed coking process. After keeping the drum inlet temperature at 510° C. and the drum internal pressure to 500 kPa (5 kgf/cm²) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black block sample up to 3 cm in size as calcined coke 2.

Calcined coke 2 was observed under a polarizing microscope for the image analysis in the same way as in Example 1. Table 2 shows the results.

Calcined coke 2 was pulverized in a similar manner as in Example 1 to obtain a powder calcined coke 2. 98 g of the obtained powder calcined coke 2 was mixed with 2 g of isotropic petroleum pitch (softening point of 230° C., remaining coal rate of 68%) having a D50 value of 2.8 μm and substantially containing no particles each having a particle diameter of 20 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

FIG. 2 shows the polarizing microscope image (480 μm×540 μm) of the scale-like graphite. The black portion is resin and the gray portion is optical structures.

Example 3

An Iranian crude oil (30°API, wax content of 2% and sulfur content of 0.7%) was distilled under ordinary pressure. Using a Y-type zeolite catalyst in a sufficient amount against the heavy distillate, fluid catalytic cracking was performed at 500° C. under ordinary pressure. A solid content such as a catalyst was centrifuged until the obtained oil became clear to thereby obtain decant oil 2. The oil was subjected to a small-sized delayed coking process. After keeping the drum inlet temperature at 550° C. and the drum internal pressure to 600 kPa (6 kgf/cm²) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black and slightly gray block sample up to 2 cm in size as calcined coke 3.

Calcined coke 3 was observed under a polarizing microscope for the image analysis in the same way as in Example 1. Table 2 shows the results.

Calcined coke 3 was pulverized in a similar manner as in Example 1 to obtain a powder calcined coke 3. 97 g of the obtained powder calcined coke 3 was mixed with 3 g of anisotropic coal pitch (softening point of 126° C., remaining coal rate of 61%) having a D50 value of 2.7 μm and substantially containing no particles each having a particle diameter of 20 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

Example 4

Decant oil in Example 1 and viscous liquid 1 in Example 2 were subjected to in-line mixing at a one-to-one rate on a volume basis while keeping the pipe hot. The oil was subjected to a small-sized delayed coking process. After keeping the drum inlet temperature at 505° C. and the drum internal pressure to 600 kPa (6 kgf/cm²) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black and slightly gray block sample up to 2 cm in size as calcined coke 4.

Calcined coke 4 was observed under a polarizing microscope for the image analysis in the same way as in Example 1. Table 2 shows the results.

Calcined coke 4 was pulverized in a similar manner as in Example 1 to obtain a powder calcined coke 4. 98 g of the obtained powder calcined coke 4 was mixed with 2 g of anisotropic petroleum pitch (softening point of 126° C., remaining coal rate of 61%) having a D50 value of 2.0 μm and substantially containing no particles each having a particle diameter of 20 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

Example 5

Decant oil 2 in Example 3 and viscous liquid 1 in Example 2 were subjected to in-line mixing at a one-to-one rate on a volume basis while keeping the pipe hot. The oil was subjected to a small-sized delayed coking process. After keeping the drum inlet temperature at 505° C. and the drum internal pressure to 600 kPa (6 kgf/cm²) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample in an SUS container was sealed from the air and cooled by water-cooling the outside of the container, while nitrogen as needed was introduced so that the inside the container is not subjected to negative pressure, to thereby obtain black and slightly gray block sample up to 2 cm in size as calcined coke 5.

Calcined coke 5 was observed under a polarizing microscope for the image analysis in the same way as in Example 1. Table 2 shows the results.

Calcined coke 5 was pulverized in a similar manner as in Example 1 to obtain a powder calcined coke 5. 98 g of the obtained powder calcined coke 5 was mixed with 2 g of isotropic coal pitch (softening point of 120° C., remaining coal rate of 59%) having a D50 value of 2.5 μm and substantially containing no particles each having a particle diameter of 20 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

Example 6

Decant oil 1 in Example 1 and viscous liquid 1 in Example 2 were subjected to in-line mixing at a one-to-one rate on a volume basis while keeping the pipe hot. The oil was subjected to a small-sized delayed coking process. After keeping the drum inlet temperature at 505° C. and the drum internal pressure to 600 kPa (6 kgf/cm²) for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample in an SUS container was sealed from the air and cooled by water-cooling the outside of the container, while nitrogen as needed was introduced so that the inside the container is not subjected to negative pressure, to thereby obtain black and slightly gray block sample up to 2 cm in size as calcined coke 6.

Calcined coke 6 was observed under a polarizing microscope for the image analysis in the same way as in Example 1. Table 2 shows the results.

Calcined coke 6 was pulverized in a similar manner as in Example 1 to obtain a powder calcined coke 6. 98 g of the obtained powder calcined coke 6 was mixed with 2 g of isotropic petroleum pitch (softening point of 120° C., remaining coal rate of 59%) having a D50 value of 6.2 μm and substantially containing no particles each having a particle diameter of 30 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

Example 7

98 g of powder calcined coke 6 obtained in Example 6 was mixed with 2 g of anisotropic petroleum pitch (softening point of 230° C., remaining coal rate of 73%) having a D50 value of 7.0 μm and substantially containing no particles each having a particle diameter of 30 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

Comparative Example 1

After subjecting powder calcined coke 2 in Example 2 was subjected to heat treatment at 3,150° C. in an Acheson furnace in the same way as in Example 1, the powder was mixed well to be used as a sample.

After measuring the various physical properties of the obtained scale-like graphite, an electrode was produced in the same way as in Example 1 and the cycle characteristics and the like were measured. Table 2 shows the results.

Comparative Example 2

Residue obtained by distilling crude oil produced in the West Coast under reduced pressure was used as a raw material. The properties of the material are 18°API, wax content of 11 mass % and sulfur content of 3.5 mass %. The material was subjected to a small-sized delayed coking process. After keeping the drum inlet temperature at 490° C. and the drum internal pressure to 2 kgf/cm² for ten hours, the drum was water-cooled to obtain black chunks. After pulverizing the obtained black chunks into pieces up to five centimeter in size with a hammer, they were heated in a rotary kiln (external-heating type with an electrical heater; aluminum oxide SSA-S Φ 120 mm inner tube) in which the outer wall temperature in the center of the inner tube is set at 1,450° C. by adjusting the feeding rate and tilting angle of the black chunks so as to set the retention time to 15 minutes.

The obtained red-hot sample was cooled in an SUS container in a similar manner as in Example 1 to obtain black and slightly gray block sample up to 3 cm in size as calcined coke 7.

Calcined coke 7 was observed under a polarizing microscope for the image analysis in the same way as in Example 1. Table 2 shows the results.

Calcined coke 7 was pulverized in a similar manner as in Example 1 to obtain a powder calcined coke 7. 98 g of the obtained powder calcined coke 7 was mixed with 2 g of isotropic petroleum pitch (softening point of 120° C., remaining coal rate of 59%) having a D50 value of 2.8 μm and substantially containing no particles each having a particle diameter of 20 μm or more by a dry method with a planetary and centrifugal mixer at 2,000 rpm for 20 minutes to obtain a mixture.

A graphite crucible was filled with the mixture and placed in an Acheson furnace with a carbonized carbon felt (2 mm) was softly put on the crucible to prevent a rapid inflow of the air. After the heat treatment at 3,150° C., the mixture was mixed well to be used as a sample.

After measuring the various physical properties of the obtained scale-like graphite, an electrode was produced in the same way as in Example 1 and the cycle characteristics and the like were measured. Table 2 shows the results.

In this example, the volume energy density of the electrode is low, which causes disadvantage in obtaining a high-density battery.

Comparative Example 3

After measuring the various physical properties of SFG44 produced by TIMCAL Graphite & Carbon, an electrode was produced in the same way as in Example 1 and the cycle characteristics and the like were measured. Table 2 shows the results.

In this example the capacity retention ratio of the electrode is low, which causes disadvantage in obtaining a high-density battery.

Comparative Example 4

100 g of Chinese scale-like natural graphite (solid carbon content: 99%, specific surface area: 9.1 m$^2$/g, D50: 26.8 μm) was processed with Hybridization System NHS-1 produced by Nara Machinery Co., Ltd. at a rotation speed of 50 m/s for three minutes. The treatment was repeated until the sample amount reaches 3.6 kg. After adding 0.4 kg of petroleum pitch pulverized so as to have D50 of 6 μm, the mixture was put into a Loedige Mixer produced by MATSUBO Corporation, and mixed until it becomes uniform by visual observation. Subsequently, 200 g of the mixture was put in an alumina crucible and heated to 1,300° C. under nitrogen atmosphere and maintained at the temperature for two hours. The obtained heat-treated product was pulverized with a pin mill, and particles having a size of 2 μm or less and particles having a size of 45 μm or more were classified and removed until they are not substantially observed in the product by a particle size distribution analyzer. After measuring the various physical properties of the product, an electrode was produced in the same way as in Example 1 and the cycle characteristics and the like were measured. Table 2 shows the results.

In this example the capacity retention ratio of the electrode is low, which causes disadvantage in obtaining a high-density battery.

TABLE 2

|  |  | Ex. 1 | Ex. 2 | Ex. 3 | Ex. 4 | Ex. 5 | Ex. 6 |
| --- | --- | --- | --- | --- | --- | --- | --- |
| Area (SOP) | μm$^2$ | 12.64 | 25.76 | 19.68 | 19.04 | 23.04 | 21.12 |
| Aspect ratio (AROP) | — | 2.13 | 2.16 | 2.15 | 2.18 | 2.14 | 2.15 |
| Average particle diameter (D50) | μm | 19.0 | 20.5 | 18.1 | 15.4 | 23.2 | 23.0 |
| (SOP * AROP)$^{1/2}$/D50 | — | 0.27 | 0.36 | 0.36 | 0.42 | 0.30 | 0.29 |
| d002 | nm | 0.3356 | 0.3356 | 0.3357 | 0.3355 | 0.3357 | 0.3356 |
| G value | — | 9.5 | 11.2 | 10.0 | 13.7 | 12.0 | 7.8 |
| BET specific surface area | m$^2$/g | 1.1 | 1.1 | 1.1 | 1.3 | 1.0 | 1.1 |
| Area (calcined coke before pulverizing) | μm$^2$ | 47.4 | 110.6 | 74.7 | 82.7 | 96.2 | 82.7 |
| Aspect ratio (calcined coke before pulverizing) | — | 2.66 | 2.81 | 2.52 | 2.69 | 2.71 | 2.69 |
| Average particle diameter of pulverized calcined coke (D50) | μm | 19.3 | 21.0 | 18.0 | 15.8 | 23.5 | 23.1 |
| Average particle diameter of raw material pitch (D50) | μm | 3.1 | 2.8 | 2.7 | 2.0 | 2.5 | 6.2 |
| Discharge capacity density | mAh/cc | 506 | 545 | 521 | 538 | 536 | 530 |
| Initial charge and discharge efficiency | % | 90.5 | 91.0 | 90.6 | 91.9 | 91.2 | 89.2 |
| Cycle capacity retention rate (150 cycles) | % | 84 | 82 | 83 | 81 | 82 | 84 |
| Capacity ratio of the rate characteristics test at a low temperature | % | 77 | 77 | 78 | 81 | 75 | 74 |
| Change rate of the electrode thickness (T500/T10) | — | 1.08 | 1.07 | 1.06 | 1.07 | 1.06 | 1.05 |

|  |  | Ex. 7 | Comparative Ex. 1 | Comparative Ex. 2 | Comparative Ex. 3 | Comparative Ex. 4 |
| --- | --- | --- | --- | --- | --- | --- |
| Area (SOP) | μm$^2$ | 21.45 | 25.44 | 5.92 | 28.96 | 99.72 |
| Aspect ratio (AROP) | — | 2.14 | 2.18 | 1.91 | 2.28 | 2.16 |
| Average particle diameter (D50) | μm | 23.5 | 20.5 | 19.5 | 24.8 | 15.4 |
| (SOP * AROP)$^{1/2}$/D50 | — | 0.29 | 0.36 | 0.17 | 0.33 | 0.95 |
| d002 | nm | 0.3356 | 0.3355 | 0.3362 | 0.3354 | 0.3356 |
| G value | — | 5.3 | 4.4 | No edge | 5.0 | No edge |

TABLE 2-continued

| | | | | | | |
|---|---|---|---|---|---|---|
| BET specific surface area | m²/g | 1.0 | 1.2 | 1.3 | 4.6 | 1.8 |
| Area (calcined coke before pulverizing) | μm² | 82.7 | 110.6 | 6.4 | — | — |
| Aspect ratio (calcined coke before pulverizing) | — | 2.69 | 2.81 | 1.93 | — | — |
| Average particle diameter of pulverized calcined coke (D50) | μm | 24.0 | 21.0 | 19.7 | — | — |
| Average particle diameter of raw material pitch (D50) | μm | 7.0 | N/A | 2.8 | — | 3.2 |
| Discharge capacity density | mAh/cc | 517 | 502 | 422 | 555 | 555 |
| Initial charge and discharge efficiency | % | 88.9 | 52.0 | 92.0 | 91.0 | 91.0 |
| Cycle capacity retention rate (150 cycles) | % | 85 | 35 | 74 | 66 | 67 |
| Capacity ratio of the rate characteristics test at a low temperature | % | 75 | 55 | 61 | 60 | 64 |
| Change rate of the electrode thickness (T500/T10) | — | 1.07 | 1.35 | 1.03 | 1.37 | 1.55 |

The invention claimed is:

1. A carbon material for a battery electrode, comprising a scale-like graphite,
wherein the scale-like graphite has a ratio $I_G/I_D$ (G value) between a peak area ($I_D$) of a peak in a range of 1300 to 1400 cm$^{-1}$ and a peak area ($I_G$) of a peak in a range of 1580 to 1620 cm$^{-1}$ measured by Raman spectroscopy spectra, in which an edge surface of a particle of the scale-like graphite is measured with a Raman microspectrometer, is 5.2 or more and 100 or less and the average interplanar spacing d002 of plane (002) by the X-ray diffraction method is 0.337 nm or less;
optical structures of the scale-like graphite observed in a rectangular field of 480 μm×540 μm under a polarizing microscope satisfy the following relationship:

$1.5 \leq AROP \leq 6$ and $0.2 \times D50 \leq (SOP \times AROP)^{1/2} < 2 \times D50,$ when areas of the optical structures are accumulated from the smallest optical structure in an ascending order, SOP represents an area of the optical structure whose accumulated area corresponds to 60% of the total area of all the optical structures; when the optical structures are counted from the optical structure of a smallest aspect ratio in an ascending order of the aspect ratio, AROP represents the aspect ratio of the optical structure which ranks at the position of 60% in the total number of all the optical structures; and D50 represents a volume-based average particle diameter measured by a laser diffraction particle size distribution analyzer; and
a BET specific surface area of the scale-like graphite is 0.4 m²/g or more and 3.5 m²/g or less.

2. The carbon material for a battery electrode, comprising the scale-like graphite as claimed in claim 1, wherein D50 is 1 μm or more and 50 μm or less.

3. The carbon material for a battery electrode, comprising the scale-like graphite as claimed in claim 1, which is artificial graphite treated at a temperature of 2,400° C. or more and 3,600° C. or less.

4. A method for producing the scale-like graphite as claimed in claim 1, comprising a process of mixing the particles obtained by pulverizing calcined coke and the particles obtained by pulverizing petroleum pitch or coal-tar pitch and subjecting the mixture to heat treatment at a temperature of 2,400° C. or more and 3,600° C. or less.

5. The production method as claimed in claim 4, wherein a volume-based average particle diameter measured by a laser diffraction particle size distribution analyzer of the particles obtained by pulverizing calcined coke (D50) Dc is 1 μm or more and 50 μm or less, and the volume-based average particle diameter of the particles obtained by pulverizing petroleum pitch or coal-tar pitch (D50) Dp is smaller than Dc and is 0.01 μm or more and 25 μm or less.

6. The production method as claimed in claim 5, wherein Dc/Dp is 1.5 or more and less than 200.

7. The production method as claimed in claim 4, wherein the mass of the particles obtained by pulverizing petroleum pitch or coal-tar pitch is 0.5 mass % or more and 15 mass % or less to the total mass of the particles obtained by pulverizing calcined coke and the particles obtained by pulverizing petroleum pitch or coal-tar pitch.

8. The production method as claimed in claim 4, wherein by observing the optical structures of the calcined coke in a rectangular field of 480 μm×540 μm under a polarizing microscope, when areas of the optical structures are accumulated from a smallest structure in an ascending order, an area of an optical structure whose accumulated area corresponds to 60% of the total area of all the optical structures is 10 μm² or more and 5,000 μm² or less; when the optical structures are counted from a structure of a smallest aspect ratio in an ascending order, the aspect ratio of the structure which ranks at the position of 60% in the total number of all the structures is 1.5 or more and 6 or less.

9. A carbon material for a battery electrode, comprising 100 parts by mass of the scale-like graphite as claimed in claim 1 and 0.01 to 200 parts by mass of natural graphite or artificial graphite, wherein an average interplanar spacing (d002) of the natural graphite or artificial graphite is 0.3370 nm or less.

10. A carbon material for a battery electrode, comprising 100 parts by mass of the scale-like graphite as claimed in claim 1 and 0.01 to 120 parts by mass of natural graphite or artificial graphite, wherein an aspect ratio of the natural graphite or artificial graphite is 2 to 100, and an average interplanar spacing (d002) of the natural graphite or artificial graphite is 0.3370 nm or less.

11. A paste for an electrode comprising the carbon material for a battery electrode as claimed in claim 1 and a binder.

12. An electrode comprising a molded body of the paste for an electrode as claimed in claim 11.

13. A battery comprising the electrode claimed in claim 12 as a constituting element.

14. The carbon material for a battery electrode as claimed in claim 1, wherein, in an evaluation test of a battery fabricated as a three electrode cell by laminating a carbon electrode (negative electrode) comprising the carbon material, a positive electrode and a reference electrode, the ratio (change rate of the electrode thickness) (T500/T10) of the thickness (T500) in a discharge state after repeating 500 cycles of charge and discharge to the thickness (T10) in a discharge state after performing 10 cycles of initial aging is 1.0 or more and 1.30 or less.

15. The electrode as claimed in claim 12, wherein, in an evaluation test of a battery fabricated as a three electrode cell by laminating the electrode (negative electrode), a positive electrode and a reference electrode, the ratio (change rate of the electrode thickness) (T500/T10) of the thickness (T500) in a discharge state after repeating 500 cycles of charge and discharge to the thickness (T10) in a discharge state after performing 10 cycles of initial aging is 1.0 or more and 1.30 or less.

16. The carbon material for a battery electrode, comprising the scale-like graphite as claimed in claim 1, wherein D50 is 1 μm or more and 25 μm or less.

17. The carbon material for a battery electrode, comprising the scale-like graphite as claimed in claim 1, wherein a BET specific surface area is 0.4 $m^2/g$ or more and 3.0 $m^2/g$ or less.

* * * * *